(12) United States Patent
Mercier et al.

(10) Patent No.: US 7,734,591 B1
(45) Date of Patent: Jun. 8, 2010

(54) COHERENT DEVICE TO DEVICE DATA REPLICATION

(75) Inventors: Christina Woody Mercier, Scotts Valley, CA (US); William Tracy Fuller, Cupertino, CA (US); Donald Edward Banks, San Jose, CA (US); Thomas Alan Rinehart, Durham, NC (US); Bang Chang, Morrisville, NC (US); Noel Christopher Melville, Santa Cruz, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 10/800,109

(22) Filed: Mar. 12, 2004

Related U.S. Application Data (63) Continuation of application No. 09/375,819, filed on Aug. 16, 1999, now abandoned.

(51) Int. Cl.
*G06F 12/00* (2006.01)

(52) U.S. Cl. ............ 707/639; 707/687

(58) Field of Classification Search ......... 711/161–162; 707/201–204
See application file for complete search history.

(56) References Cited

U.S. PATENT DOCUMENTS

| | | | | |
|---|---|---|---|---|
| 4,400,778 A | | 8/1983 | Vivian et al. .................. 710/1 |
| 5,241,631 A | * | 8/1993 | Smith et al. .................. 710/305 |
| 5,649,152 A | | 7/1997 | Ohran et al. ................. 711/114 |
| 5,819,292 A | | 10/1998 | Hitz et al. .................. 707/203 |
| 5,835,953 A | | 11/1998 | Ohran ......................... 711/162 |
| 5,867,733 A | * | 2/1999 | Meyer ......................... 710/74 |
| 5,913,028 A | | 6/1999 | Wang et al. .................. 709/203 |
| 6,038,639 A | | 3/2000 | O'Brien et al. .............. 711/114 |
| 6,073,222 A | | 6/2000 | Ohran ......................... 711/162 |
| 6,078,932 A | | 6/2000 | Haye et al. .................. 707/204 |
| 6,085,298 A | | 7/2000 | Ohran ......................... 711/162 |
| 6,128,306 A | | 10/2000 | Simpson et al. .............. 370/412 |
| 6,205,479 B1 | | 3/2001 | Dulai et al. .................. 709/225 |
| 6,212,531 B1 | * | 4/2001 | Blea et al. .................... 707/204 |
| 6,256,739 B1 | | 7/2001 | Skopp et al. ................. 713/201 |
| 6,385,706 B1 | * | 5/2002 | Ofek et al. ................... 711/162 |
| 6,397,308 B1 | * | 5/2002 | Ofek et al. ................... 711/162 |
| 6,487,561 B1 | * | 11/2002 | Ofek et al. ................... 707/204 |
| 6,920,537 B2 | * | 7/2005 | Ofek et al. ................... 711/163 |
| 7,107,395 B1 | * | 9/2006 | Ofek et al. ................... 711/112 |
| 2003/0061456 A1 | * | 3/2003 | Ofek et al. ................... 711/162 |
| 2004/0098547 A1 | * | 5/2004 | Ofek et al. ................... 711/162 |

(Continued)

OTHER PUBLICATIONS

Aho, A.V., Hopcraft, J.E., and Ullman, J.D., "Data Structures and Algorithms", Reading:Addison-Wesley, 1983, pp. 135-145.

(Continued)

*Primary Examiner*—Luke S Wassum
(74) *Attorney, Agent, or Firm*—Cesari and McKenna, LLP (57) ABSTRACT

An apparatus provides coherent data copying operations where data replication is controlled by a source storage controller directly to a destination controller and managed by a remote application. The apparatus generates a snapshot version for each source data block changed by one or more write operations to the source data block during the course of a copy operation; and copies each block of the source data to a corresponding block in the destination data in the absence of the snapshot version of the block and otherwise copying the snapshot version of the source data block to the corresponding block in the destination data.

32 Claims, 7 Drawing Sheets

U.S. PATENT DOCUMENTS

2005/0204108 A1* 9/2005 Ofek et al. .................. 711/162

OTHER PUBLICATIONS

Peterson, J.L. and Silberschatz, A., "Operating System Concepts", Reading: Addison-Wesley, 1983, pp. 12-15.

Scwartz, A.M., et al., "LFS—A Local File System for Multiprocessor NFS Network Servers", Auspex Systems, Inc. Technical Report, Dec. 4, 1989.

Network Appliance, Inc., "Network Appliance™ SnapMirror® Software", downloaded from netapp.com, pamphlet DS-236 Rev. Mar. 2002.

Brown, K. et al., "SnapMirror and SnapRestore: Advance in Snapshot Technology", Network Appliance, Inc. Technical Report TR-3043, undated.

Hitz, D., revised March Marchi, M., "A Storage Networking Appliance", Network Appliance, Inc. Technical Report TR-3001, Rev. Oct. 2000.

Business Wire, "Network Appliance Announces New Enterprise-Ready Data ONTAP Software", Apr. 26, 1999.

Watson, A. and Benn, P., "Multiprotocol Data AccessL NFS, CIFS and HTTP", Network Appliance, Inc. Technical Report TR-3014, Rev. May 3, 1999.

Hutchinson, N.C. et al., "Logical vs Physical File System Backup", Proceedings of the $3^{rd}$ Symposium on Operating Systems Design and Implementation (OSDI '99), Feb. 1999, pp. 239-249.

Brown, A. et al., "ISTORE: Introspective Storage for Data-Intensive Network Services", University of California, Berkeley, Computer Science Division, Report CSD-98-1030, Dec. 23, 1998.

Green, R.J. et al., "Designing a Fast, On-line Backup System for a Long-structured File System", Digital Technical Journal, vol. 8 No. 2, 1996, pp. 32-45.

Hitz, D. et al., "File System Design for an NFS Files Server Appliance", Network Appliance, Inc. Technical Report 3002, Rev. C, Mar. 1995.

Hitz, D., "An NFS File Server Appliance", Network Appliance Corporation, Technical Report TR01, Aug. 1993.

Mercier et al. "Coherent Device To Device Data Replication", U.S. Appl. No. 09/375,819, filed Aug. 16, 1999, 29 pages.

* cited by examiner

COHERENT DEVICE TO DEVICE DATA REPLICATION

This application is a continuation and claims the benefit of priority under 35 U.S.C. Section 120 of U.S. application Ser. No. 09/375,819, filed Aug. 16, 1999, now abandoned and which is incorporated by reference herein.

BACKGROUND

The invention relates to systems and methods for replicating distributed data over a network.

The advent of client-server technology has led to a widespread sharing and communication of data over one or more computer networks, including local area networks and wide area networks such as the Internet. In client-server systems, users perform processing in connection with data and programs that may be stored in the network's mass storage systems through network-attached personal computers and workstations. The personal computers/workstations, operating as clients, download the data and programs from the network mass storage systems for processing and upload the resulting data to the network mass storage systems. The ubiquity of client applications has led to an explosion of data that needs to be stored.

To meet growing storage demand, new storage architectures have been developed: Network Attached Storage (NAS) and Storage Area Network (SAN). In a NAS, intelligent storage devices connect directly to the network and are dedicated to file serving in a client/server relationship. The NAS device has its own processor with an operating system or micro kernel, and processes file I/O protocols, such as NFS, to manage the transfer of data between itself and its clients. To applications running on the network, the NAS device appears to be a server. To a client, the NAS device is a large file system.

In an SAN environment, the function of storage is detached from network servers and centralized and managed as a separate network resource. SANs that are based on Fibre Channel buses have recently emerged as one of the high performance data communications environments available today to interconnect servers and storage. Running at Gigabit speeds and built on open standards, SANs offer better scalability, fault recovery and general manageability than conventional client-server LAN based approaches.

Data stored in the data storage devices needs to be backed-up to protect against data corruption and to permit the recovery of the data exactly as they existed at a particular point in time in the event of system failure or inadvertent loss of data. The data is typically automatically backed up on a daily or other periodic basis and is stored on either tape or optical archive media. However, during a data back-up operation, the data being backed-up may be accessed by an application and changed.

Since denying access to data during the back-up operation is normally unacceptable, the file server typically captures a snapshot of changed data during the back-up operation. During the snapshot operation, the file server intercepts write operations to the data while backing-up the unchanged data before allowing the write operations to modify the data. During the copy operation, the file server reads each data block to be copied and writes it to the target storage device. Snapshot data bytes are inserted in their proper locations to maintain data coherency. The read/write operation requires the data to travel across a storage channel twice. As such, significant file server processor and memory resources and SAN bandwidth are used during the data copy operation.

SUMMARY

The invention provides an apparatus and a method for copying a source data object to a destination data object while maintaining data coherency. The source data object is controlled by a source storage device controller, and the destination data object is controlled by a destination storage device controller.

In one aspect, a method includes: managing the source and destination storage device controllers using a remote application; generating a snapshot version for each block of the source data object changed by one or more write operations to the block during the course of a copy operation; and copying each block of the source data to a corresponding block in the destination data object in the absence of the snapshot version of the block and otherwise copying the snapshot version of the source data object block to the corresponding block in the destination data object, wherein data is directly transferred between the source and destination storage device controllers.

Implementations of the invention include one or more of the following. Each block can span a byte range. A snapshot map can be maintained to identify snapshot source data. The snapshot map can be used to determine whether an existing write operation modifies a snapshot version of the block. The snapshot map can be updated after generating a snapshot of the source data. A write operation to the data object can be held until the snapshot is updated. The write operation can be released to update the data object if a snapshot version of the block to be written to already exists.

In another aspect, an apparatus for copying a source data object distributed over one or more source controllers to a destination data object distributed over one or more destination controllers includes: a source storage controller to control access to the source data object, the source storage controller adapted to take a snapshot version of each block in the source data object before updating the source data object block; and a replication manager to control multiple source storage device controllers, the replication manager enabling the one or more source controllers to take snapshots to provide a coherent copy of the destination data object.

Implementations of the invention include one or more of the following. One or more commands can be sent to the source storage device controllers using a protocol. The command can be a copy command or a snapshot command. The protocol can be an in-band protocol or an out-of-band protocol.

In another aspect, a system for copying source data while maintaining data coherency includes means for generating a snapshot version for each source data block changed by one or more write operations to the source data block during the course of a copy operation; and means for copying each block of the source data to a corresponding block in the destination data in the absence of the snapshot version of the block and otherwise copying the snapshot version of the source data block to the corresponding block in the destination data.

Implementations of the invention include one or more of the following. The block can span a byte range. The list of blocks to be copied can be reordered by the storage device controller to optimize copy speed. Additional control data may be inserted before and after source data blocks while copying to the destination device. The list of blocks to be copied may be buffered on the source storage controller while awaiting further copy requests. The block size can be specified to the storage device controller so that fixed-size blocks are written to the destination controller device. The system can have a means for maintaining a snapshot map to identify snapshot source data. The system can also have a means for looking-up the snapshot map to determine whether an existing write operation modifies a snapshot version of the block.

Advantages of the system includes the following. The invention increases the availability and responsiveness of the system by removing the file server from the data path and utilizing logic on the data storage devices' controllers to move data during data transfer operations. In addition to reducing processing overhead, the invention supports coherent device to device copy operations, which substantially increase data replication performance for large data objects. The invention can handle large data objects which may be distributed over many storage devices. Moreover, high-speed replication of distributed data between multiple data storage devices is achieved without compromising the relationship, order, or temporal coherency of the data. The above features are provided with minimal processing resources and reduction of channel storage network bandwidth resources.

Since these activities are independent of file input/output operations, requests from network file systems such as Network File System (NFS) and CIFS are serviced simultaneously with no performance degradation. This allows systems administrators to perform system management functions such as file backup and restore during normal system operation when the size of data is so large that a copy or backup cannot be completed during off-hours.

The resulting system is powerful, scalable and reliable enough to allow users to consolidate their data for different applications onto one high performance system instead of scores of smaller, less reliable systems.

Other features and advantages will be apparent from the following description and the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

The invention will be described with respect to particular embodiment thereof, and reference will be made to the drawings, in which.

DETAILED DESCRIPTION

Figure 1:
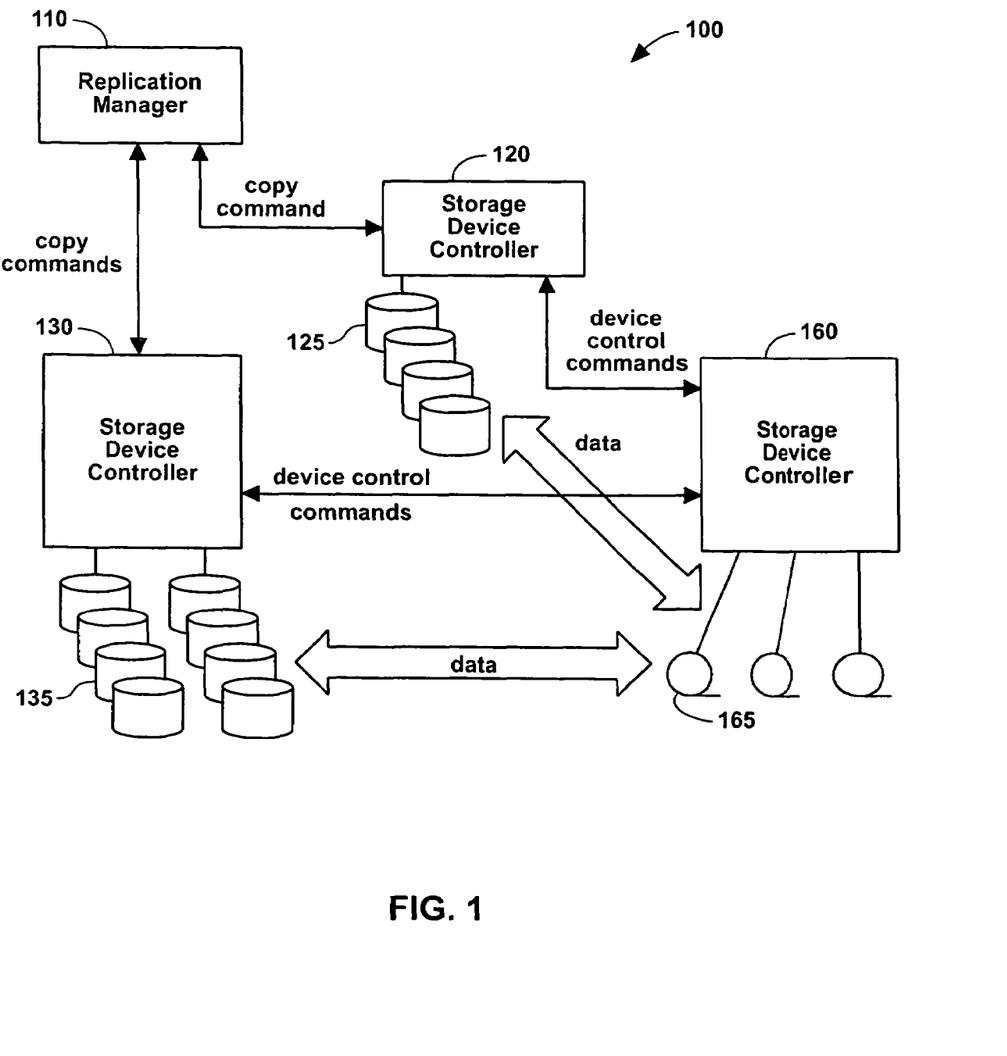
FIG. 1 is block diagram illustrating a system for performing coherent device to device copy operations.

FIG. 1 shows a system 100 for performing coherent device to device copy operations between data storage device controllers. This process is managed by a replication manager 110 which communicates with a plurality of data storage device controllers 120, 130 and 150. Each storage device controller manages one or more volumes of related data. The replication manager 110 is aware of data objects and the volume(s) that the data objects reside in. The data objects can represent a file system, file or any other data construct, or can be defined by applications as related data consisting of one or more volumes in a specified order.

The data storage device controller 120 controls one or more data storage devices 125. Similarly, the data storage device controller 130 controls one or more data storage devices 135 and the data storage device controller 160 controls one or more data storage devices 165. Although the embodiment of FIG. 1 shows the data storage devices 125 and 135 as disk drives and the data storage device 165 as one or more magnetic tape storage systems, a number of different data device controllers may be attached to the replication manager 110. For instance, on-line devices such as RAID (Redundant Array of Independent Disks) disk arrays as well as off-line devices such as tape farms, optical jukeboxes or robotic tape silos can be used. The on-line devices tend to be fast, while the off-line devices offer very large capacities with slower data access times and are typically used for long-term off-site data storage archiving.

The replication manager 110 controls the data object copy operation by issuing snapshot and copy commands to various volumes and partial volumes of the storage device controllers. In this context, the process of copying data to another location before it is changed by a write operation is called taking a "snapshot". The replication manager 110 may specify the record size to the storage device controller 130 so that fixed size records are written. The replication manager may insert control data before and after source data blocks. The replication manager 110 also tracks the progress of the copy operation and monitors the utilization of resources.

The replication manager 110 also maintains the data object order by sequentially initiating or controlling simultaneous operations of the copy function for volumes or portions of volumes. The volume byte order as well as the time relationship order is maintained by the snapshot function. Upon initiation by the replication manager 110, the snapshot function starts a snapshot capability on a storage device controller for a specified volume or partial volume. A snapshot volume, or other non-volatile storage large enough to contain the snapshot, on the storage device is specified for the storage device controller to save volume data that is updated via normal write commands. The storage device controller then creates and updates a snapshot map in its cache of the disk blocks written to the snapshot volume, as discussed in more detail in FIG. 4. Pseudo code for the snapshot function is shown below:

```
Receive snapshot request
Set up snapshot map for the Volume specified
When time_start is reached
While copy is not complete or cancel flag not set
    Wait for a write command
    If write received for specified Volume is being snapshot
        If write for byte range specified in snapshot
            If all bytes in write not previously snapshot
                Copy bytes not previously snapshot into
                    snapshot storage location
                Update the snapshot map
            Endif
        Endif
    Endif
End While
```

Upon receipt of the copy commands from the replication manager 110, the storage device controller 120, 130 or 160 performs a copy function from its local storage device to one or more target devices specified by the replication manager 110.

The copy function initiated by the replication manager 110 starts a volume or partial volume replication on the storage device controller to itself or another specified storage device. The snapshot function is initiated before start of the copy function (unless the object is off-line). The copy function utilizes the snapshot map to determine which bytes should be used from the snapshot volume. Pseudo-code of the copy function is shown below.

```
Copy request received
While (blocks of source Volume data remain) or
    (cancel flag or suspend flag is not set)
{
    Check snapshot map for the Volume for snapshot bytes in the block
    If bytes have been snapshot
        Use snapshot bytes from the
        snapshot Volume for copy
    Else
        use volume bytes for copy
    Endif
    Create a write request for a block of appropriate source data to
    the target
Volume
    Write block of data to the target Volume
    Update the snapshot map with the copy progress
{
End While
```

The copy operation may reorder the blocks to optimize copy speed. The source storage controller may buffer the blocks to be copied.

Errors received during the copy operation are forwarded to the replication manager 110 and the copy operation is placed in a suspend state by the storage device controller. The replication manager can also initiate a suspend by using a suspend function to stop the volume copy operation. The suspend function places the storage device controller copy in a suspended state and sets the suspend flag for the current volume. When the copy operation is suspended, the storage device controller continues the snapshot function in preparation for continuing the copy later when a resume function is received. The resume function causes the replication manager 110 to execute a suspended copy operation. This function resumes the received copy operation and clears the suspend flag for the volume.

Additionally, a cancel function can be initiated by the replication manager 110 to end a snapshot and/or copy function for the specified volume. This function cancels the request received and sets the cancel flag for the current volume. The copy operation can not be resumed after a cancel command as the storage device controller frees the snapshot map and state of the copy.

Figure 2:
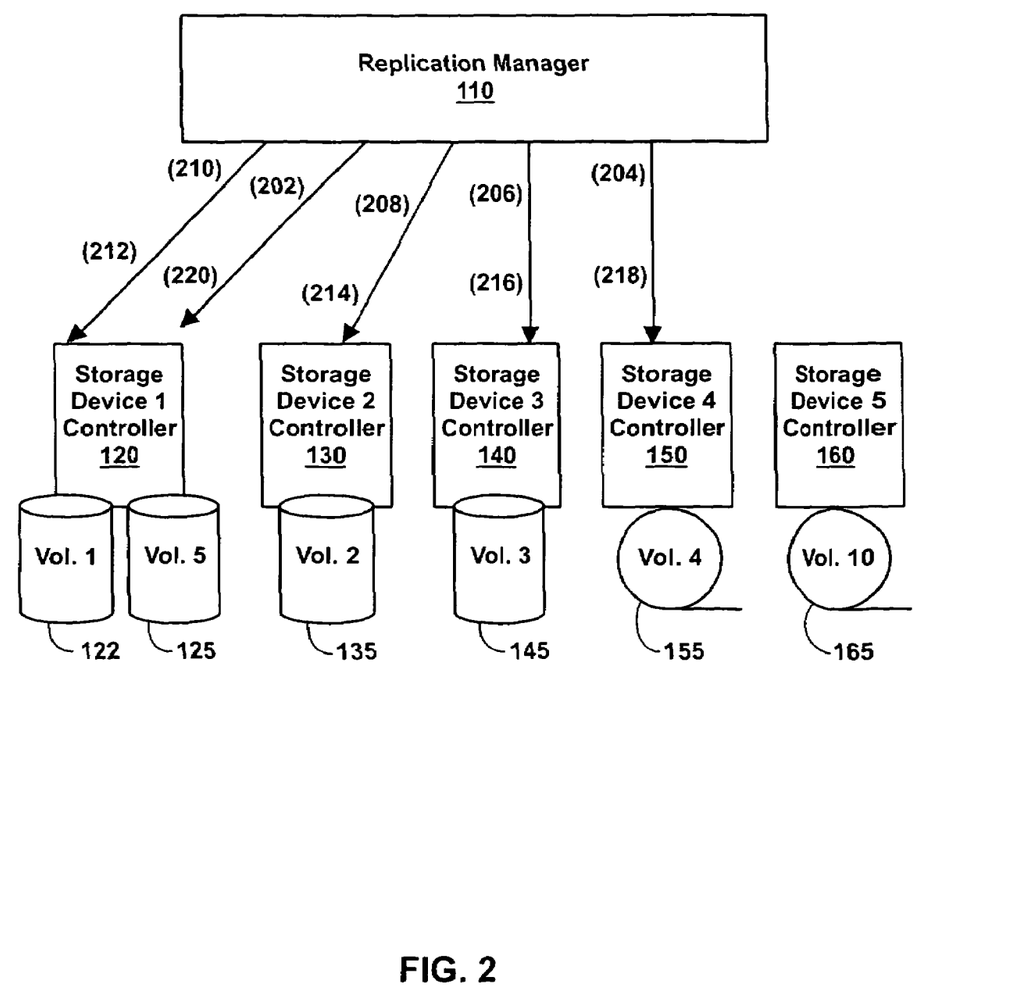
FIG. 2 block diagram showing a replication manager controlling storage systems.

Referring now to FIG. 2, an exemplary communication between the replication manager 110 of FIG. 1 and various data storage device controllers 120, 130, 140, 150 and 160 is shown. The replication manager 110 communicates with the data storage device controller 120, which in turn communicates with data storage devices 122 and 125, logically marked as Vol1 and Vol5, respectively. The replication manager 110 also communicates with the data storage device controller 130 which controls the data storage device 135 assigned as Vol2. Similarly, the replication manager 110 communicates with the data storage device controller 140 which controls the data storage device 145, assigned as logical unit Vol3.

The replication manager 110 also communicates with the data storage device controller 150, which controls the magnetic tape storage device 155. The magnetic tape storage device 155 is assigned to logical unit Vol4. The data storage device controller 150 which controls the magnetic tape storage device 155, logically Vol10, is communicated to by the other storage device controllers. In this example 120, 130, 140, and 150 are source device controllers and 160 is a target device controller.

The replication manager 110 also communicates with the data storage device controller 150, which controls the magnetic tape storage device 155. The magnetic tape storage device 155 is assigned to logical unit Vol4. The data storage device controller 160 which controls the magnetic tape storage device 165, logically Vol10, is communicated to by the other storage device controllers. In this example 120, 130, 140, and 150 are source device controllers and 160 is a target device controller.

The monitoring of the copy and snapshot functionality of each volume of the data object is performed by receiving status from storage device controllers 120, 130, 140 and 150 that report resource utilization, errors, and percentage complete during the course of the copy operation. End to end flow control is managed by the replication manager 110 by use of a suspend function. Errors are managed using request retries or resets. Status is returned to the replication manager 110 by the storage device controllers 120, 130, 140, and 150 at predetermined intervals to report on the completion percentage of the copy operation and to take a current view or "snapshot" of resource usage such volume space and cache utilization. Status is also reported at completion. When errors are encountered by the storage device controller, the error message is forwarded to the replication manager 110 and the volume copy is then suspended. The replication manager manages the recovery for the error and then resumes if it succeeds or cancels if it fails.

Status is returned to the replication manager 110 by the storage device controllers 110, 120, 130, 140, and 150 at predetermined intervals to report on the completion percentage of the copy operation and to take a current view or "snapshot" of resource usage such volume space and cache utilization. Status is also reported at completion. When errors are encountered by the storage device controller, the error message is forwarded to the replication manager 110 and the volume copy is then suspended. The replication manager manages the recovery for the error and then resumes if it succeeds or cancels if it fails.

As discussed above, the replication manager 110 maintains the overall coherency of the copy of the data object. Generally, the replication manager 110 executes a startup sequence which: (1) enables the snapshot function for the requested volume(s) or partial volume(s); (2) enables the copy function for the volume which starts the command and copy to the target device(s).

During the data object copy operation, write commands are received for the volume and steps to maintain coherency for the volume following receipt of a data write are enforced. Data object order is ensured as the replication manager 110 issues sequential copy requests or controls simultaneous copy requests. To ensure time coherency, a snapshot function is enabled for every volume in the data object copy before initiating the copy on the first volume. Snapshot time synchronization will be performed by the replication manager. The replication manager will set a snapshot start time utilized by the storage device controllers or use an alternative interface (such as suspending file system activity). The snapshot time synchronization implementation selected is dependent upon the attributes of the object being replicated and the specific replication manager implementation.

Figure 3A:
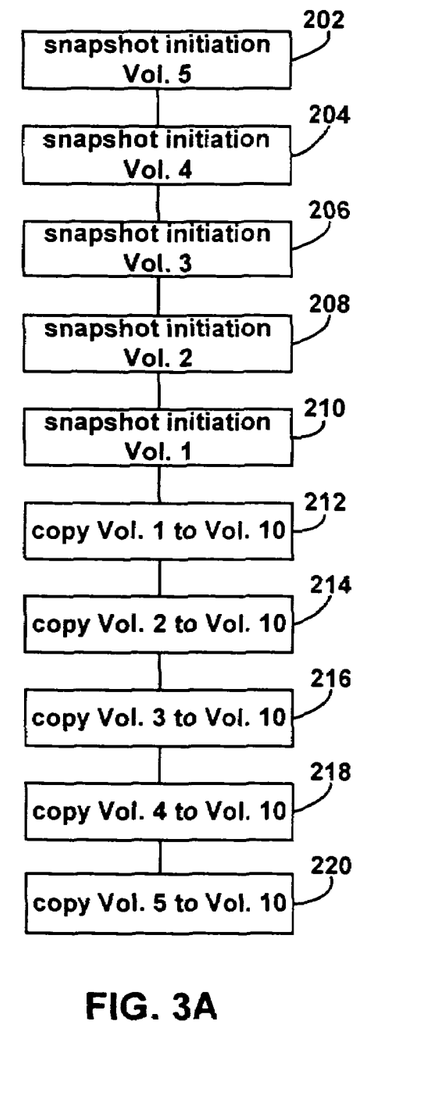
FIGS. 3A-3B are flowcharts illustrating processes for performing the coherent device to device copy operations.
Figure 3B:
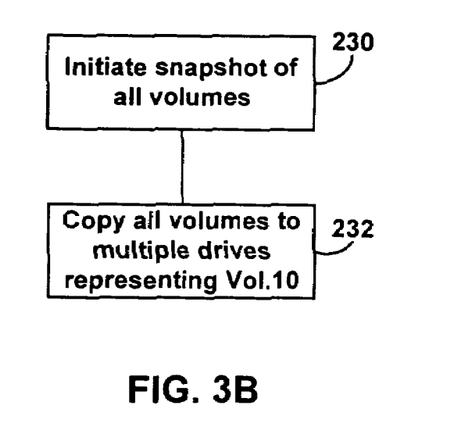

FIGS. 3A and 3B show alternate processes for performing data transfers using the embodiment of FIG. 2. The replication manager 110 controls the data object copy operation by initiating a snapshot for every volume. Next a copy command is issued to the first volume. When it is complete, a copy is issued to each of the remaining volumes.

FIG. 3A shows a process for sequentially performing, while FIG. 3B shows a process for copying operations in parallel. In FIG. 3A, the snapshot function for Vol5 is initiated (step 202). Next, the snapshot function for Vol4 is initiated (step 204). Next the snapshot function for Vol3 (step 206), Vol2 (step 208) and Vol1 (step 210) are initiated. Next, in steps 212-220, Vol1-Vol5 are copied to Vol10. Alternatively, in FIG. 3B, a simultaneous initiation of snapshots for Vol1-Vol5 is started in step 230 and then parallel copies of Vol1-Vol5 are taken in step 232.

Figure 4:
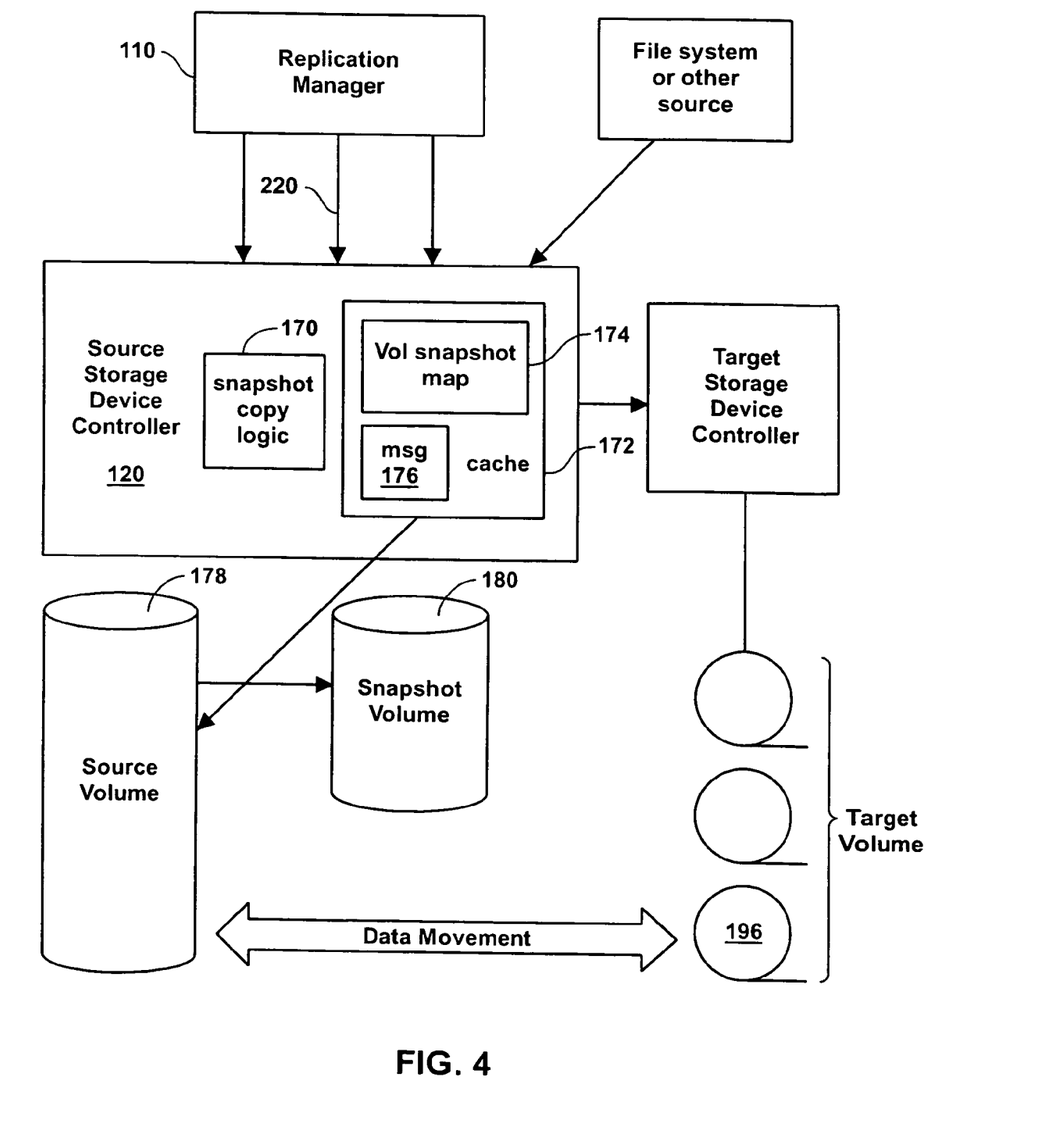
FIG. 4 is a block diagram illustrating an embodiment of the invention for copying data between data storage devices.

FIG. 4 shows that the storage device controller performs copies while maintaining the coherency of the data object. Coherency includes maintaining the order of the data bytes and the temporal relationship. Temporal relationship maintenance means that a copy of the data object started at 11 AM will result in all the data copied being in the state it was at 11 AM, even if the copy operation takes many hours to complete. Maintaining coherency requires that writes received by the Storage Device Controller for the data object being copied are either held back until the copy is complete or delayed a short time while data bytes to be changed by the write are copied to another location (i.e., snapshot).

Referring now to FIG. 4, the operation of the replication manager 110 in conjunction with an exemplary data storage device controller 120 is shown. In this example, the snapshot map is saved in the storage device controller's cache and the snapshot data is stored in a disk volume. The snapshot data could be stored on any non-volatile storage. In FIG. 4, the replication manager initiates a snapshot for a volume and specifies a snapshot volume 180. The storage device controller snapshot and copy logic 170 sets up a cache with volume snapshot information 174. The replication manager initiates a copy of the volume 220 which causes the storage device controller logic 170 to generate I/O commands to write the volume 178 to the target volume 196. The snapshot function maintains coherency of the volume data being copied, before and during the copy initiation. When a write command message 176 is received from a file system or other source, the storage device controller logic 170 (1) holds the command in cache 172, (2) checks if the byte range of the write request is within the snapshot range, if so (3) checks if the byte range has already been snapshot: if so, it skips to step 5 and otherwise it (4) copies the byte range from the source volume 178 to the snapshot volume 180, and (5) updates the volume snapshot map 174. Finally the controller 120 allows the message 176 to update the source volume 178. The copy function checks the volume snapshot map 174 for every block to determine if bytes snapshot to the snapshot volume 180 should be substituted for bytes on the source volume 178 when copying to the target volume 196.

Figure 5:
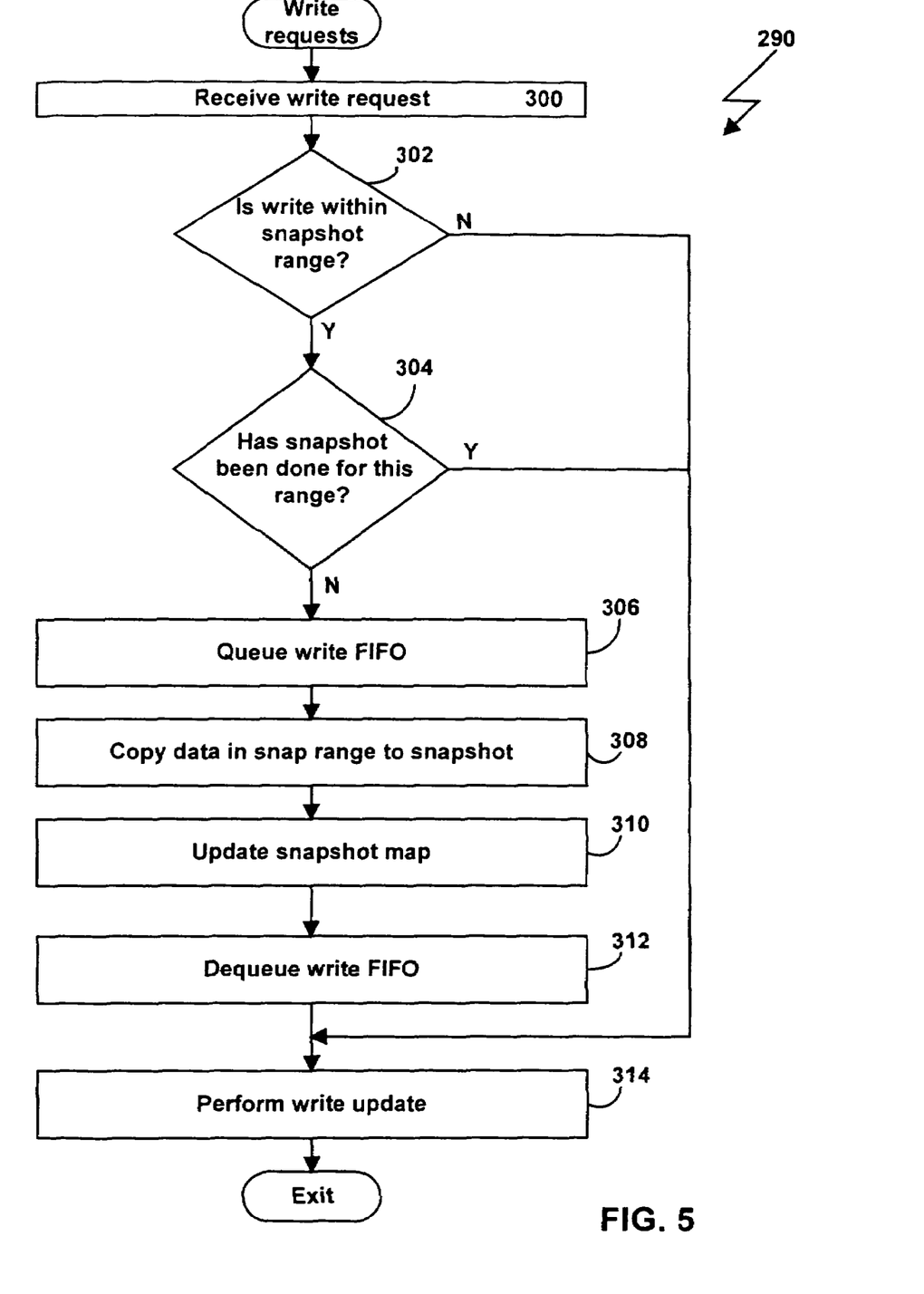
FIG. 5 is a flowchart illustrating a process for handling write operations on a data storage device controller.

Referring now to FIG. 5, a process 290 illustrates in more detail the handling of write requests during snapshot operation of the system of FIG. 4. Before initiating the process 290, a snapshot start for a range of bytes on a specified volume is taken. The process 290 then receives a write for the specified volume with some or all of the range of bytes to be snapshot (step 300). The process 290 then checks the specified volume against a snapshot map for to determine if bytes in the range in the write request overlap with a range of bytes to be snapshot (step 302). If not, the process 290 proceeds to step 314. If the write request range overlaps the snapshot range, the process 290 checks whether all of the bytes which are about to be written have been snapshot before (step 304). If so, the process 290 then continues with step 314. If not, the process 290 queues the current write request in a first in first out (FIFO) queue, along with all subsequent writes for the portion of the volume (step 306). The process 290 copies bytes that have not been previously snapshot and that are to be changed by the write to the snapshot volume (step 308). The process 290 then updates the snapshot map to reflect byte range and location in snapshot volume (step 310). The process 290 then releases the write request (step 312) by dequeuing the write request and a write update operation is made to the specified volume (step 314) before exiting.

Each storage device controller 120, 130, 140, and 150 (FIG. 2) has a snapshot function that is enabled by a snapshot request from the replication manager 110. Once enabled, the snapshot function checks every incoming write against the specified volume to determine if bytes in the write will change bytes specified in the snapshot. If the write affects bytes specified in the snapshot and the bytes have not been previously snapshot, the storage device controller makes a copy of the bytes to a specified snapshot volume. A snapshot map in cache is created and updated. The snapshot map is located in the storage device controller's local cache. A unique map exists for each volume being snapshot. The map contains information about the byte range of changed data within the Volume and its location in the snapshot Volume. Volume snapshot map resources in cache are not freed until the end of copy or a cancel command is received from the replication manager 110.

Figure 6:
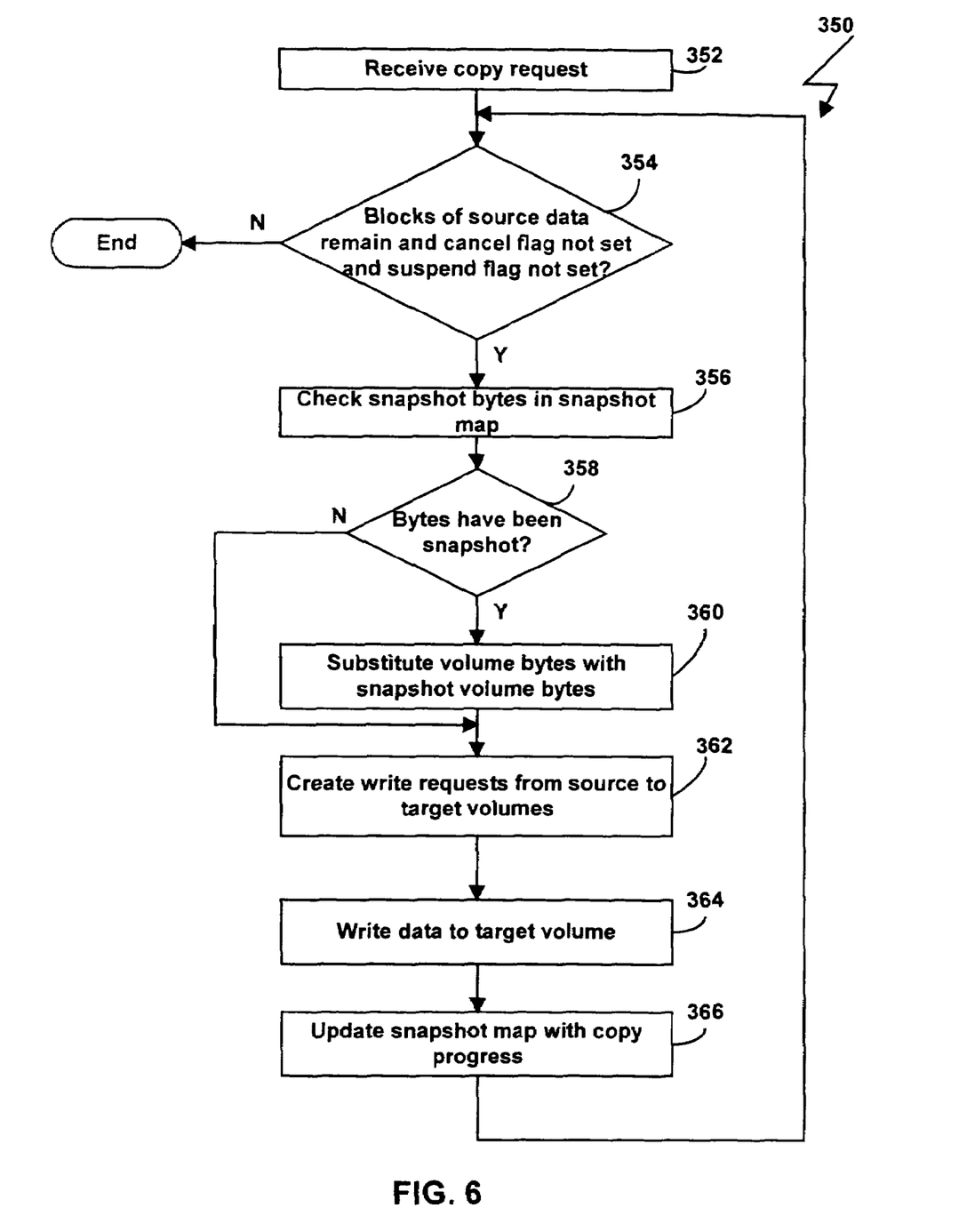
FIG. 6 is a flowchart illustrating a copy operation using a data storage device controller.

The storage device controller supports a copy function which uses storage device commands such as SCSI commands to copy the specified data from source devices to target devices. FIG. 6 shows a process 350 which illustrates the copy operation of the system of FIG. 4. First, a copy request is received (step 352). Next, the process 350 checks whether: (1) blocks of source volume data remain; and (2) a cancel flag is not set; and (3) suspend flag is not set (step 354). If any of those conditions are not true, the copy ends. If all of these conditions are true, the process 350 checks the snapshot bytes (step 356) in the snapshot map. If bytes have not been snapshot, it branches to step 362. If bytes have been snapshot (step 358), it substitutes volume bytes with snapshot bytes from the snapshot volume (step 360). From step 360, the process 350 creates write requests from the source to target volumes (step 362) and writes the blocks of data to the target volume (step 364). The snapshot map in the controller cache is updated with the copy progress (step 366). The copy progress is used by the snapshot function and used to send status to the replication manager 110.

Before issuing a copy write of bytes to the target storage device, the storage device controller checks the snapshot map. If bytes within the copy write range have changed, then the bytes in the snapshot volume are used in the volume in the data stream to the target device.

Figure 7:
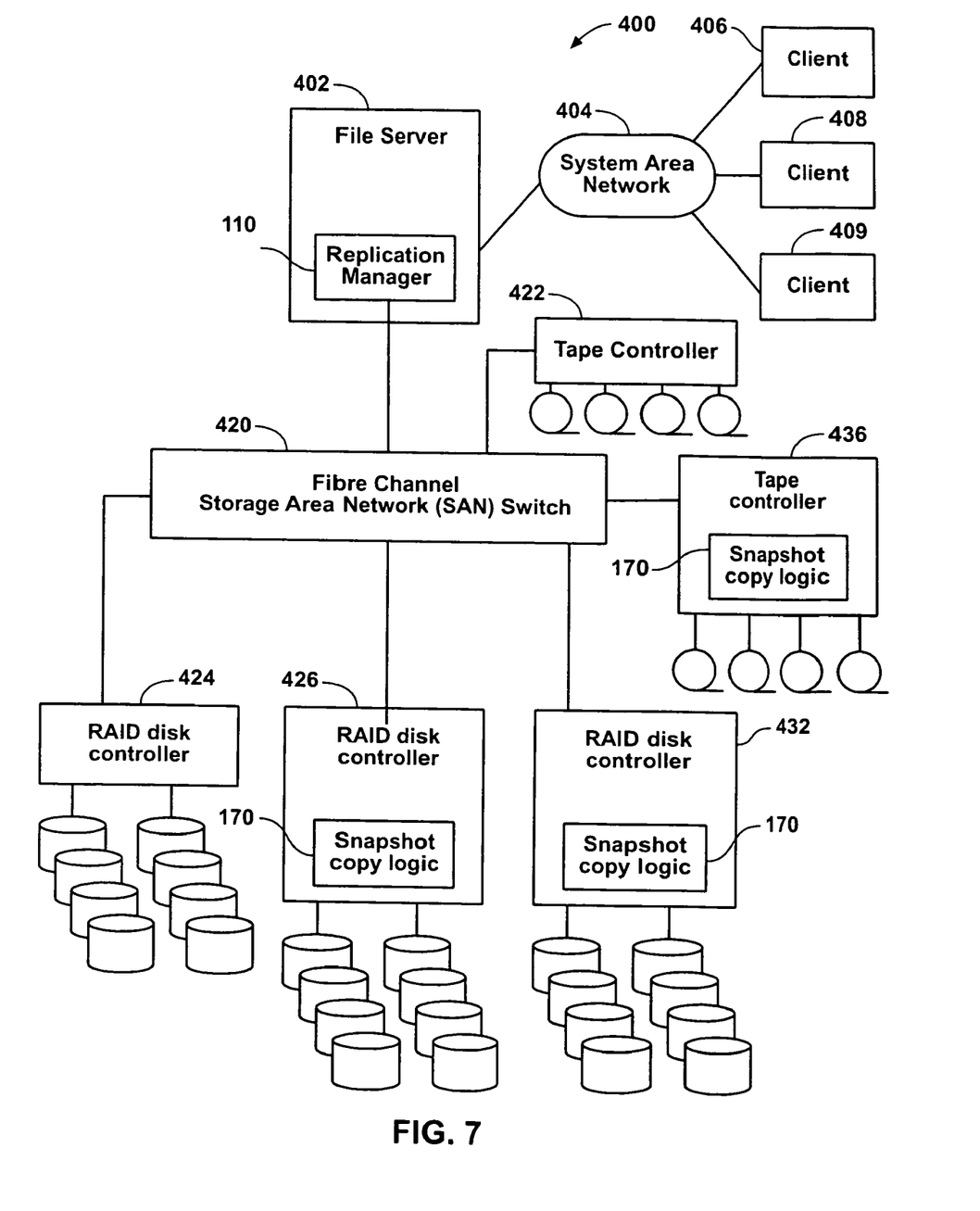
FIG. 7 is a block diagram illustrating an embodiment of a file server system.

FIG. 7 shows an embodiment of a computer system 400 for providing direct copying operations between device controllers. The system 400 has a file server 402 which is connected to a system area network 404 for communicating with a plurality of clients 406, 408 and 409. The file server 402 also executes the replication manager 110 discussed above. The file server 402 is connected to a fibre channel storage area network (SAN) switch 420.

Also connected to the SAN switch 420 is one or more tape drive controllers 422 and 436. The SAN switch 420 also communicates with RAID disk array controllers 424, 426 and 432. The RAID disk controller 426 includes the coherent device to device replicating logic (snapshot and copy) controller logic 170 and similarly, the RAID disk controller 432 includes logic 170. Similarly, the tape controller 436 includes logic 170 which supports tape-to-tape copy operations.

FIG. 7 shows an embodiment of the replication manager 110 executing on a file server 402 controlling copy and snapshot on controllers 426, 432, and 436. In FIG. 7, the file server 402 communicates with one or more clients 406, 408 and 409 using a network 404 which may be a LAN or a WAN.

The file server also communicates with a Fibre Channel storage area network (SAN) switch 420. The SAN switch 420 in turn allows connectivity with tape drive controllers 422 and 436 as well as disk drive controllers 424, 426 and 432, for example. In particular, the disk controllers 426 and 432 and the tape controller 436 are shown with the coherent device to device replication logic 170.

The coherent device to device copy and snapshot logic 170 is required in each of the source storage device controllers. Clients connected to the network 404 may cause the replication manager 110 to enable the copy operation by requesting a backup operation, a migration of a file to tape, or a snapshot request, from an application for a file or the file system. The replication manager 110 may reside on one or more platforms not shown in this example.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. A storage system, comprising:
   a destination storage device configured to store a copy of data from a source storage device;
   a snapshot storage device configured to store a snapshot version of the data from the source storage device;
   a process configured to initiate a copy operation of the source storage device, wherein the copy operation is configured to copy each block of the source storage device to the destination storage device, and wherein the copy operation is performed in segments, and wherein each segment is a range of data bytes of the source storage device;
   the storage system configured to receive a write request to modify a requested range of data bytes of the source storage device while the copy operation of the source storage device is in progress, wherein the write request to modify the requested range of data bytes is a write request range;
   the storage system further configured to determine that the write request range falls within the range of data bytes of the source storage device being copied while the copy operation is in progress;
   in response to determining that the write request range falls within the range of data bytes of the source storage device being copied while the copy operation is in progress, the storage system further configured to determine if a particular range of the range of data bytes of the source storage device to be modified by the write request range has already been written to the snapshot storage device;
   in response to determining that the particular range of the range of data bytes of the source storage device to be modified by the write request range has already been written to the snapshot storage device, the copy operation further configured to copy one or more bytes of the particular range of the range of data bytes from the snapshot storage device to the destination storage device, the process further configured to write the write request to the source storage device; and
   in response to determining that the particular range of the range of data bytes of the source storage device to be modified by the write request range has not already been written to the snapshot storage device, the process further configured to copy the particular range of the range of data bytes of the source storage device to the snapshot storage device, the process further configured to write the write request to the source storage device.

2. The storage system of claim 1, wherein the source storage device is organized in a RAID system.

3. The storage system of claim 1, wherein the storage system is further configured, in response to determining the write request range falls within the range of data bytes being copied, to hold the write request in a cache and update a snapshot map.

4. The storage system of claim 1, further comprising a server configured to execute the process.

5. The storage system of claim 4, wherein the server is operatively connected to a storage area network switch and the server is further configured to communicate with the storage system through the storage area network switch.

6. The storage system of claim 1, wherein the process is configured to control multiple storage systems.

7. The storage system of claim 1, wherein the write request comprises a SCSI commands.

8. The storage system of claim 1, wherein the storage system is further configured to send one or more commands by using an in-band protocol.

9. The storage system of claim 1, further comprising:
   a first in first out queue configured to buffer the write request in response to determining that the particular range of the range of data bytes of the source storage device to be modified by the write request range has not been written to the snapshot.

10. The storage system of claim 1, wherein the storage system is further configured to send one or more commands by using an out-of-band protocol.

11. A method, comprising:

starting a copy command from a source storage device to a destination storage device, wherein the copy command copies each block of the source storage device to the destination storage device, the copy command being performed in segments and each segment specifying a range of data bytes of the source storage device;

receiving a write request to modify a requested range of data bytes of the source storage device while the copy command is in progress, wherein the write request to modify the requested range of data bytes is a write request range;

determining if the write request range falls within the range of data bytes of the source storage device being copied;

determining, in response to the write request range falling within the range of data bytes of the source storage device being copied, if a particular range of the range of data bytes of the source storage device to be modified by the write request range has already been written to a snapshot;

copying, in response to the particular range of the range of data bytes of the source storage device to be modified by the write request range having already been written to the snapshot, one or more bytes of the particular range of the range of data bytes to the destination storage device from the snapshot; and copying, in response to the particular range of the range of data bytes of the source storage device to be modified by the write request range having not already been written to the snapshot, the particular range of the range of data bytes to the snapshot, and writing the write request to the source storage device.

12. The method of claim 11, wherein the source storage device is organized in a RAID system.

13. The method of claim 11, further comprising:

in response to determining the write request range falls within the range of data bytes of the source storage device being copied, holding the write request command in a cache, and updating a snapshot map associated with the snapshot.

14. The method of claim 11, further comprising:

executing the copy command by a replication manager.

15. The method of claim 11, further comprising:

connecting a server to a storage area network switch and communicating with a storage system through the storage area network switch to execute the copy command.

16. The method of claim 11, further comprising:

controlling multiple storage device controllers by a replication manager.

17. The method of claim 11, wherein the write request comprises a SCSI command.

18. The method of claim 11, further comprising:

sending a storage system command using one of an in-band protocol or an out-of-band protocol.

19. The method of claim 11, further comprising:

placing the write request in a first in first out queue in response to determining that the particular range of the range of data bytes of the source storage device to be modified by the write request range has not been written to the snapshot.

20. The method of claim 11, further comprising:

in response to determining that the write request range does not fall within the particular range of the range of data bytes of the source storage device being copied, determining if the write request range is directed to a next particular range of the range of data bytes that has not yet been written to the snapshot; and in response to determining that the write request range is directed to the next particular range of the range of data bytes that has not yet been written to the snapshot, copying the next particular range of the range of data bytes not yet written to the snapshot.

21. A computer-implemented method, comprising:

starting a copy operation by copying data from a source storage device to a destination storage device, the copy operation being performed in segments, and each segment having a range of data bytes of the source storage device;

receiving a write request to modify a requested range of data bytes of the source storage device while the copy operation is in progress, wherein the write request to modify the requested range of data bytes is a write request range;

determining if the write request range falls within the range of data bytes of the source storage device being copied;

determining, in response to the write request range being in the range of data bytes of the source storage device being copied, if a particular range of the range of data bytes of the source storage device to be modified by the write request range has been written to a snapshot;

copying, in response to the range of data bytes of the source storage device to be modified by the write request range having been written to the snapshot, one or more bytes of the particular range of data bytes to the destination storage device from the snapshot; and copying, in response to the range of data bytes of the source storage device to be modified by the write request range having not been written to the snapshot, the particular range of the range of data bytes of the source storage device to the snapshot, and then writing the write request to the source storage device.

22. A system, comprising:

a destination storage device configured to store a copy from a source storage device;

a snapshot storage device configured to store a snapshot version of the data from the source storage device;

a process configured to initiate a copy operation of the source storage device wherein the copy operation comprises copying each block of the source storage device to the destination storage device, the copy operation being performed in segments, and each segment having a range of data bytes of the source storage device;

the system configured to receive a write request to modify a requested range of data bytes of the source storage device while the copy operation is in progress, wherein the write request to modify the requested range of data bytes is a write request range;

the system further configured to determine that the write request range falls within the range of data bytes of the source storage device being copied;

in response to determining that the write request range falls within the range of bytes of the source storage device being copied, the system further configured to determine if a particular range of the range of data bytes of the source storage device to be modified by the write request range has been written to a snapshot of the snapshot storage device;

in response to determining that the particular range of the range of data bytes of the source storage device to be modified by the write request range has been written to the snapshot, the process further configured to copy one or more bytes of the particular range of the range of data bytes to the destination storage device from the snapshot storage device; and in response to determining that the particular range of the range of data bytes of the source storage device to be modified by the write request range has not been written to the snapshot, the process further configured to copy the particular range of the range of data bytes of the source storage device to the snapshot storage device, the process further configured to write the write request to the source storage device.

23. The system of claim 22, wherein the process is executed on a file server and is further configured to control the source storage device and one or more other storage devices.

24. The system of claim 22, further comprising a list of source storage device data blocks to be copied, wherein the list is configured to be reordered.

25. The system of claim 24, wherein the list of source storage device data blocks to be copied is buffered while the system awaits further copy commands.

26. The system of claim 22, wherein the process is further configured to insert control data before and after a source storage device data block is copied.

27. The system of claim 22, wherein the process is further configured to specify a block size so that the storage system writes one or more fixed-size blocks.

28. A method, comprising:

receiving a write request while a copy operation is in progress wherein the copy operation comprises copying each block of a source to a destination, the copy operation being performed in segments, and each segment has a range of data bytes of the source, the write request to modify a requested range of data bytes in a source storage device, wherein the write request to modify the requested range of data bytes is a write request range;

determining if the write request range being copied falls within a particular range of the range of data bytes of the source storage device to be modified by the write request range;

determining that the particular range of the range of data bytes of the source storage device to be modified by the write request range has not been written to a snapshot;

in response to determining that the particular range of the range of data bytes of the source storage device to be modified by the write request range has not been written to the snapshot, copying the particular range of the range of data bytes of the source storage device to be modified by the write request range to the snapshot before modifying the particular range of the range of data bytes of the source storage device;

in response to determining that the particular range of the range of data bytes of the source storage device to be modified by the write request range has been written to the snapshot, copying one or more bytes of the particular range of the range of data bytes to the destination from the snapshot;

updating a snapshot map, wherein the snapshot map indicates which blocks of the range of data bytes are located in the snapshot; and modifying the particular range of the range of data bytes of data in the source storage device from the write request.

29. A computer-readable storage media containing executable program instructions executed by a processor, comprising:

program instructions that receive at a source storage device a write request issued from a storage system, the write request specifying a first range of data bytes of the source storage device, the write request being received while the source storage device is being copied to a destination storage device;

in response to receiving the write request, program instructions that hold the write request in a cache;

program instructions that check if the first range overlaps with a particular range of the range of data bytes of the source storage device to be modified by the write request that is being copied to the destination storage device;

program instructions that determine if the particular range of the range of data bytes of the source storage device to be modified by the write request has already been written to a snapshot storage device;

in response to the first range overlapping with the particular range of the range of data bytes of the source storage device to be modified by the write request already having been written to the snapshot storage device, program instructions that copy one or more bytes of the particular range of the range of data bytes from the snapshot storage device to the destination device;

program instructions that update a snapshot map; and program instructions that allow the write request to write to the source storage device.

30. A method for making a copy of data in a database, comprising:

starting a copying operation of a source storage device to a destination storage device, wherein the copy operation is performed in segments and each segment is a range of data bytes of the source storage device, the copy operation started at a begin time;

maintaining a snapshot volume that includes each block of the source storage device that has a write request directed to that block during a course of the copy operation;

receiving a write request directed to a particular range of the range of data bytes to be modified by the write request range that currently is being copied to the destination storage device;

in response to determining that the particular range of the range of data bytes to be modified by the write request range has been copied to the snapshot volume, continuing the copy operation to the destination storage device using one or more bytes of the particular range of the range of data bytes from the snapshot;

in response to determining that the particular range of the range of data bytes to be modified by the write request range has not been copied to the snapshot volume, holding the write request until the particular range of the range of data bytes to be modified by the write request range is copied to the snapshot volume;

after completion of writing the particular range of the range of data bytes to be modified by the write request range to the snapshot volume, executing the write request on the source storage device to update the source storage device; and copying the snapshot volume to the destination storage device, wherein the copied snapshot volume maintains a copy of a data on the destination storage device as the data existed on the source storage device at the begin time.

31. A system to make a copy of data in a database, comprising:
- a process executing on a processor of the system configured to initiate a copy operation of a source storage device to a destination storage device, wherein the copy operation is performed in segments and each segment is a range of data bytes of the source storage device, the copy operation started at a begin time;
- the system configured to maintain a snapshot volume that includes each block of the source storage device that has a write request directed to that block during a course of the copy operation;
- the system is further configured to receive a write request directed to the range of data bytes currently being copied to the destination storage device;
- in response to determining that a particular range of the range of data bytes to be modified by the write request range has been copied to the snapshot volume, the system further configured to continue the copy operation to the destination storage device using one or more bytes of the particular range of data bytes from the snapshot;
- in response to determining that a particular range of the range of data bytes to be modified by the write request range has not been copied to the snapshot volume, the system further configured to hold the write request until the particular range of the range of data bytes to be modified by the write request range are copied to the snapshot volume;
- after completion of writing the particular range of the range of data bytes to be modified by the write request range to the snapshot volume, the system is further configured to execute the write request on the source storage device to update the source; and
- the system further configured to copy the snapshot volume to the destination storage device, wherein the copied snapshot volume is configured to maintain a copy of a data on the destination storage device as the data existed on the source storage device at the begin time.

32. A computer-readable storage media containing executable program instructions executed by a processor, comprising:
- program instructions that start a copying operation of a source storage device to a destination storage device, wherein the copy operation is performed in segments and each segment is a range of data bytes of the source storage device, the copy operation started at a begin time;
- program instructions that maintain a snapshot volume that includes each block of the source storage device that has a write request directed to that block during a course of the copy operation;
- program instructions that receive a write request directed to a particular range of the range of data bytes to be modified by the write request range that currently is being copied to the destination storage device;
- in response to determining that the particular range of the range of data bytes to be modified by the write request range has been copied to the snapshot volume, program instructions that continue the copy operation to the destination storage device using one or more bytes of the particular range of the range of data bytes from the snapshot;
- in response to determining that the particular range of the range of data bytes to be modified by the write request range has not been copied to the snapshot volume, program instructions that hold the write request until the particular range of the range of data bytes to be modified by the write request range are copied to the snapshot volume;
- program instructions that, after completion of writing the particular range of the range of data bytes to be modified by the write request range to the snapshot volume, execute the write request on the source storage device to update the source storage device; and
- program instructions that copy the snapshot volume to the destination storage device, wherein the copied snapshot volume maintains a copy of a data on the destination storage device as the data existed on the source storage device at the begin time.

* * * * *